L. DUVALL.
Hand Plow.
No. 99,543.
Patented Feb. 8, 1870.
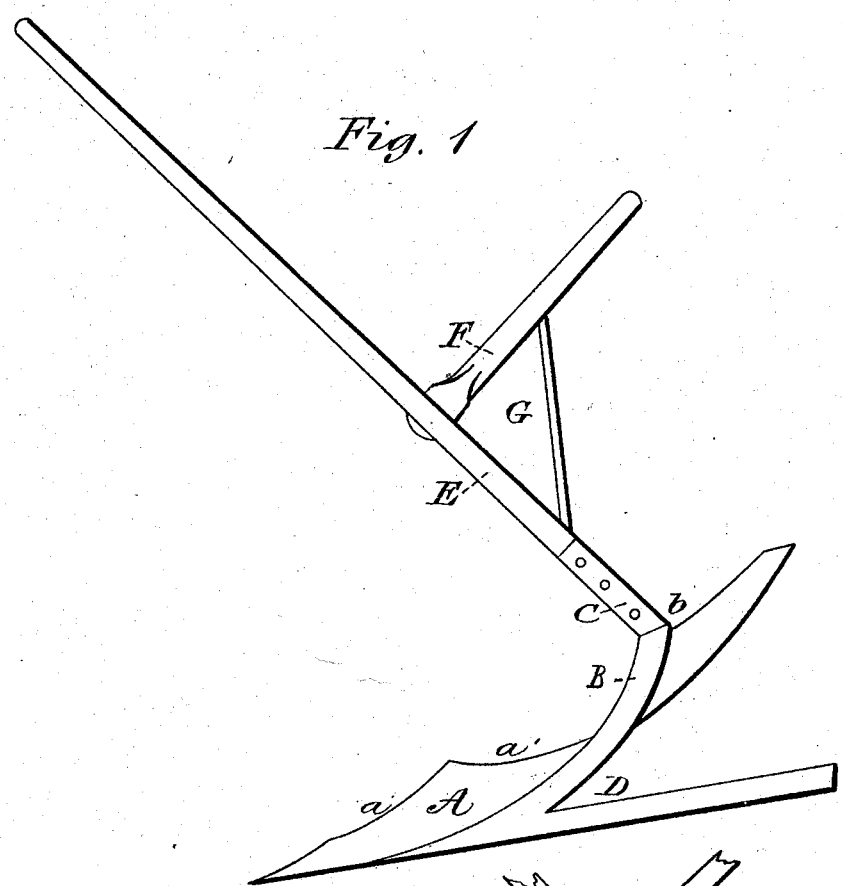
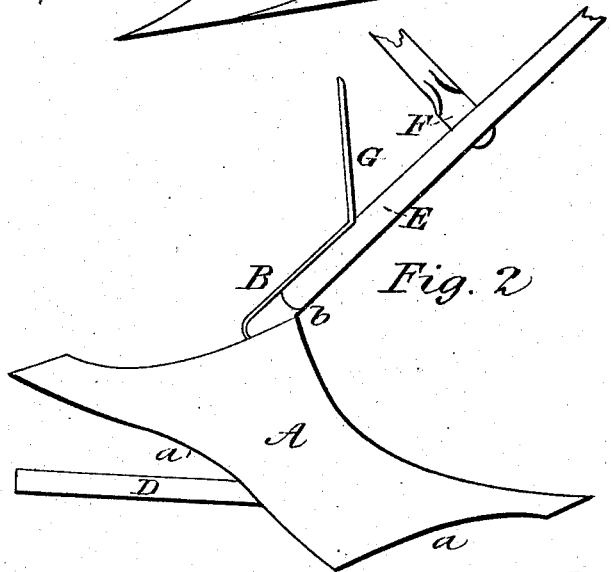

UNITED STATES PATENT OFFICE.

LEWIS DUVALL, OF BIG SPRING, KENTUCKY.

IMPROVEMENT IN HAND-CULTIVATORS.

Specification forming part of Letters Patent No. 99,543, dated February 8, 1870.

*To all whom it may concern:*

Be it known that I, L. DUVALL, of Big Spring, in the county of Breckinridge and State of Kentucky, have invented a new and useful Improvement in Hand-Cultivators; and I do hereby declare that the following, taken in connection with the accompanying plate of drawings, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that description of agricultural implements termed "hand-cultivators;" and it consists of a share or iron blade of peculiar construction, provided with a bar for the purpose of guiding the same, and a main handle secured to the shank of the said share at an angle of forty-five degrees from the said bar, to which (to wit, the main handle aforesaid) a secondary or short handle is attached, whose direction is perpendicular to the direction of the said main handle.

The object of my invention is to provide an implement to be used in lieu of the common hoe in ordinary agricultural operations, and so constituted, with reference to physical laws which govern the motions of the body, that it may be used with the greatest facility and ease.

In the accompanying plate of drawings, which illustrate my invention, and form a part of the specification thereof, Figure 1 is a perspective view of my invention; Fig. 2, a reversed view of the same.

Like parts are represented by the same letters in each of the said figures.

The share A, constructed of wrought or cast metal, of any description which I prefer to use, is attached by bolts, by welding, or other means to the shin B. The said shin is curvilinear in form, occupying an arc of about ninety degrees, or one-fourth of the circumference of a circle. The inner side of the same lies in a plane perpendicular to the plane of the horizon, and the outer side, to which the share is attached, is at an angle of about forty-five degrees from the inner side aforesaid. The said share is, therefore, a warped surface, situated at an angle of about forty-five degrees from the plane of the inner side of the shank C, shin B, and bar D. The cutting-edge $a$ of the said share A is at an approximate angle of forty-five degrees from the bar D aforesaid. The length of the said bar D is equal to twice the depth and width of the share—to wit, twice the length of a perpendicular line let fall from either the apex of the edges $a$ $a'$ or the upper end, $b$, of the shin B upon the lower edge of the said bar D. The bar aforesaid, by this construction, is caused to act as a lever to hold the share in position as it passes through the soil.

The shank C, to which the main handle E is secured, may be made solid with the shin B aforesaid, or otherwise fastened to the same. The direction of the said shank is at an angle of forty-five degrees from the direction of the bar D. The said main handle may be attached to the shank aforesaid by bolts or in any other convenient manner. The said main handle is about four feet four inches long, and is provided with a secondary handle, $t$, which is secured to the main handle aforesaid by a tenon or otherwise, at a point about two feet from the shank aforesaid. The direction of the secondary handle is perpendicular to that of the main handle. A brace, G, is used to hold the said handles firmly in position.

Having thus represented the construction and combination of the component parts of my invention, I will proceed to describe its operation.

In using the common hoe and other straight-handled implements, the position of the body and limbs is constrained and cramped, the rear hand being backward and upward, and the forward hand downward, thus throwing the rear hand and shoulder upward and the fore shoulder downward and twisting the whole body into an uneasy and restless position, and compelling the operator to do most of the work with one hand.

My invention is used with a stroke similar to that of the common hoe; but the body is erect, the rear shoulder hanging naturally in an easy position, the rear hand grasping the main handle, the forward hand grasping the short or secondary handle, which, as hereinbefore stated, is at an angle of ninety degrees from the main handle. The trunk and limbs are thus made to occupy an unconstrained and easy position.

In using my invention, the share passes easily through the soil, its motion being guided by the bar D, receiving the dirt upon an angular surface, and throwing it upon one side.

Having thus described my invention, I claim and desire to secure by Letters Patent—

The handles E and F, when arranged as described, in combination with the share A, shank C, and bar D, substantially as herein set forth.

LEWIS DUVALL.

Witnesses:
A. K. MORRIS,
WM. WISEHEART.